United States Patent
Salo

(12) 
(10) Patent No.: US 6,542,883 B1
(45) Date of Patent: Apr. 1, 2003

(54) ORDERING RELATIONAL DATABASE OPERATIONS ACCORDING TO REFERENTIAL INTEGRITY CONSTRAINTS

(75) Inventor: Timo J. Salo, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/521,877

(22) Filed: Mar. 9, 2000

(51) Int. Cl.[7] .............................. G06F 17/30; G06F 7/00
(52) U.S. Cl. ........................ 707/1; 707/103; 707/104.1
(58) Field of Search .................. 707/1–5, 102–104, 707/201–205, 8, 206; 709/217, 223, 227, 230–231

(56) References Cited

U.S. PATENT DOCUMENTS

| | | | | |
|---|---|---|---|---|
| 5,404,510 A | | 4/1995 | Smith et al. ................ | 395/600 |
| 5,546,576 A | * | 8/1996 | Cochrane et al. ............ | 707/2 |
| 5,551,027 A | * | 8/1996 | Choy et al. ................. | 707/201 |
| 5,581,756 A | | 12/1996 | Nakabayashi ............... | 395/602 |
| 5,717,924 A | | 2/1998 | Kawai ........................ | 395/613 |
| 5,758,335 A | | 5/1998 | Gray .......................... | 707/2 |
| 5,778,370 A | | 7/1998 | Emerson .................... | 707/100 |
| 5,819,086 A | * | 10/1998 | Kroenke et al. ............ | 707/102 |
| 5,819,254 A | | 10/1998 | Kawai ........................ | 707/2 |
| 5,926,807 A | | 7/1999 | Peltonen et al. ............ | 707/3 |
| 5,974,407 A | | 10/1999 | Sacks ......................... | 707/2 |

FOREIGN PATENT DOCUMENTS

| | | | | |
|---|---|---|---|---|
| EP | AB0428264 | 5/1991 | ............ | G06F/15/40 |
| GB | AA2347243 | 8/2000 | ............ | G06F/17/30 |

OTHER PUBLICATIONS

Rahayu et al ("Implementation of Object–Oriented Association relationships in Relational Databases," IEEE Comput. Soc., 1998).

IBM Technical Disclosure Bulletin, "Dynamic Ordering of Joined Rows using Fields form Multiple Tables," 93A 62949//R08920658, Nov. 1993, v. 36, n. 11, pp. 363–366.

IBM Technical Disclosure Bulletin, "Table Storage Architecture for the OS/2 Extended Edition Database Manager," 89A 62046//AT8871114, Oct. 1989, pp. 30–32.

* cited by examiner

Primary Examiner—Safet Metjahic
Assistant Examiner—Te Chen
(74) Attorney, Agent, or Firm—Gregory M. Doudnikoff; Marcia L. Doubet

(57) ABSTRACT

A method, system, and computer program product for increasing the efficiency of operations that are to be performed against an arbitrary relational database by automatically ordering the operations according to the referential integrity constraints defined for the affected tables. Because the ordering is performed programmatically, the application developer is relieved of the burden of attempting to structure the application in a manner that avoids violating the referential integrity constraints. The efficiency of modifying the database increases significantly using this technique. The ordering may be performed at a database engine. Existing applications may take advantage of this ordering technique, without requiring change to the application itself. Batch-mode write operations are possible when using this technique, thereby reducing the number of network round-trips that must be performed.

33 Claims, 13 Drawing Sheets

Main flow for the operation ordering

| 300 | Company Number 303 | Company Name 304 |
|---|---|---|
| 301 | 01 | Acme Company |
| 302 | 02 | Widget Manufacturing |

FIG. 3A
Company table foreign key to Company

| 310 | Department Number 315 | Department Name 316 | Company Number 317 |
|---|---|---|---|
| 311 | D01 | Development | 02 |
| 312 | E01 | Administration | 01 |
| 313 | E21 | Support | 01 |
| 314 | E31 | Operations | 01 |

FIG. 3B
Department table

|  | Employee 325 Number | Employee Name 326 | Department 327 Number (foreign key to Department) | Spouse 328 Identifier (foreign key to Spouse) |
|---|---|---|---|---|
| 320 | | | | |
| 321 | 00010 | Jane Doe | E21 | S3100 |
| 322 | 00050 | John Smith | E01 | S2100 |
| 323 | 00100 | John Q Public | E01 | S2010 |
| 324 | 00320 | Mary Jones | E31 | S3101 |

FIG. 3C
Employee table

|  | Spouse 335 Identifier | Spouse 336 Name |
|---|---|---|
| 330 | | |
| 331 | S2010 | Ann Public |
| 332 | S2100 | Cindy Smith |
| 333 | S3100 | Fred Doe |
| 334 | S3101 | Allen Jones |

FIG. 3D
Spouse table

|  | Address 345 Identifier | Address 346 | Employee 347 Identifier (foreign key to Employee) |
|---|---|---|---|
| 340 | | | |
| 341 | AD001 | 1345 E. 87th St. | 00320 |
| 342 | AD003 | 12 Penny Lane | 00050 |
| 343 | AD007 | 789 Main Street | 00100 |
| 344 | AD010 | 43 Circle Drive | 00010 |

FIG. 3E
Address table

| 400 | 405 Operation Type | 406 Table Name | 407 Primary Key | 408 Foreign Key | 409 Foreign Key Table |
|---|---|---|---|---|---|
| 410 | Insert | Employee | 00011 | E11 | Department |
| 415 | Update | Department | D01 | C01 | Company |
| 420 | Insert | Department | E11 | C01 | Company |
| 425 | Delete | Department | E31 | *00320 | *Employee |
| 430 | Delete | Employee | 00320 | *AD001 | *Address |
| 435 | Insert | Employee | 00012 | E21 | Department |
| 440 | Delete | Address | AD001 | | |

FIG. 4A

Unsorted Operations

| 450 | 405 Operation Type | 406 Table Name | 407 Primary Key | 408 Foreign Key | 409 Foreign Key Table |
|---|---|---|---|---|---|
| 420 | Insert | Department | E11 | C01 | Company |
| 410 | Insert | Employee | 00011 | E11 | Department |
| 435 | Insert | Employee | 00012 | E21 | Department |
| 415 | Update | Department | D01 | C01 | Company |
| 440 | Delete | Address | AD001 | | |
| 430 | Delete | Employee | 00320 | *AD001 | *Address |
| 425 | Delete | Department | E31 | *00320 | *Employee |

FIG. 4B

Operations after Ordering

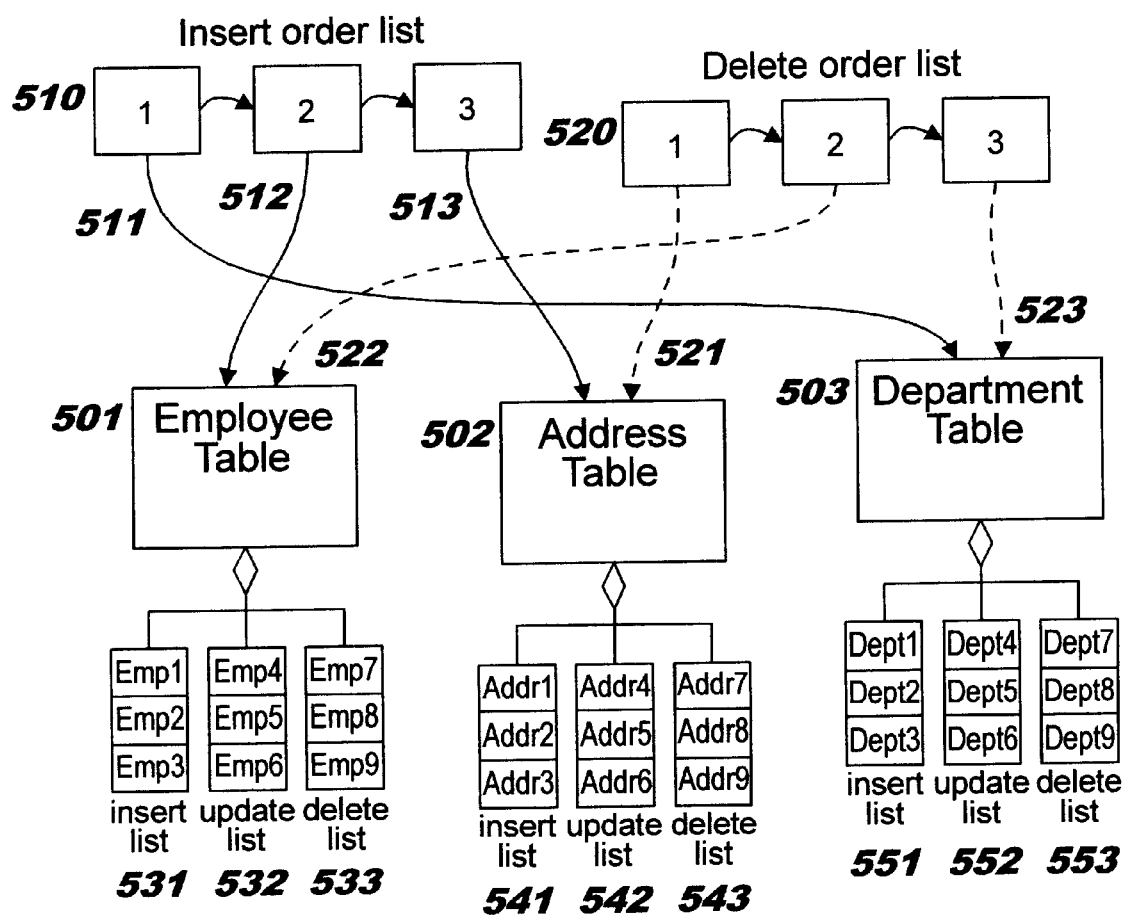

Main flow for the operation ordering

Ordering tables according to their relative database operation precedences

Determining the insert-precedence between the current table and the related table Cluster tuples according to their corresponding tables and operation types A database schema augmented with relationship information

ORDERING RELATIONAL DATABASE OPERATIONS ACCORDING TO REFERENTIAL INTEGRITY CONSTRAINTS

BACKGROUND OF THE INVENTION

1. Field of the Invention

The present invention relates to the field of computer programming, and more particularly to a method, system, and computer readable code for increasing the efficiency of operations that are to be performed on a relational database by programmatically ordering the operations according to the referential integrity constraints defined for the affected tables.

2. Description of the Related Art

"Referential integrity" refers to a property of relational databases wherein the consistency among tables of a database is maintained. In particular, maintaining referential integrity requires that all foreign key values in the rows of each table are valid. A foreign key is valid if its value either (1) is null, or (2) appears as a primary key in some row of an identified table. The table in which the primary key is contained is often called the "parent" table, and the table in which the foreign key is contained is called the "dependent" table. A particular table may have no foreign keys, in which case there are no referential integrity constraints to be enforced for this table, or the table may have one or more foreign keys. When a table has multiple foreign keys, then there are multiple parent/dependent table relationships and a referential integrity constraint must be enforced for each such relationship.

Referential integrity constraints must be enforced when operations are performed on the database to insert or delete rows of tables and when update operations affect foreign key values. The insert constraint requires that each foreign key value in a row being inserted must already appear as a primary key value in the corresponding parent table. For example, suppose a database has an Employee table and a Department table, and that each row of the Employee table has a column entry identifying the department in which that employee works. The department column may be defined as a foreign key in the Employee table, where the corresponding primary key is a department number in the Department table. In this example, maintaining referential integrity requires that a department is created in the Department table before employees can be defined for that department in the Employee table. The delete constraint requires that the primary key of a row to be deleted cannot be specified as the foreign key value of one or more rows in any dependent tables. Using the same Employee and Department tables as an example, if a department is to be deleted from the Department table, maintaining referential integrity requires that all Employee rows referring to the department number of this department are deleted first (or that the delete operation is prevented). The update constraint requires that an update to a foreign key value must use a new value that already appears as a primary key in the parent table (or that the update sets the foreign key value to null).

Thus, it can be seen that the order in which operations are performed against a relational database is critical to maintaining the referential integrity of the database. Many database systems are commercially available which provide detection of potential referential integrity constraint violations, and prevent the operations which would lead to an inconsistent database from being performed. (An invalid insert operation, for example, may generate an error message indicating that it contains a foreign key value which has not yet been used as a primary key value.) The DATABASE 2# product, commonly referred to as DB/2®, from the International Business Machines Corporation (IBM) is an early example of this type of database system. ("DATABASE 2" is a trademark, and "DB/2" is a registered trademark, of IBM.)

The order in which operations must be performed to avoid referential integrity constraint violations typically does not match the order in which relational rows are created or deleted within application programs. Therefore, the order in which the rows need to be inserted or deleted from the database cannot be deduced from the application's event flow. Furthermore, when a user is providing information for creating or deleting rows interactively, requiring the user to specify the information in the proper order for maintaining referential integrity places an unreasonable burden on the user of understanding the (possibly complex) table interrelationships and requires him to work in an inflexible, non-intuitive manner.

U.S. Pat. No. 6,456,995 (Ser. No. 09/224,427, filed Dec. 31, 1998), which is titled "Systems, Methods and Computer Program Products for Ordering Objects Corresponding to Database Operations that are Performed on a Relational Database Upon Completion of a Transaction by an Object-Oriented Transaction System" and which is assigned to the same assignee as the present invention, defines a technique for programmatically ordering the operations to be performed on relational databases in order to avoid referential integrity constraint violations. The technique defined in this referenced invention orders operations at the object level, for object-oriented programming applications, using associations between objects.

It would be advantageous to have a technique for programmatically ordering operations that can be used with applications which are not object-oriented, and/or which can be used outside the scope of the application generating the changes (such as at a relational database engine, upon receiving non-ordered operations from an application), thereby avoiding change to the application itself. Without automatic database operation ordering, programmers need to either manually code the operation ordering into the application program which generates the operations, or disable the referential integrity rule enforcement in the database. Manually coding the operation ordering is time-consuming and error prone, and easily leads to unmaintainable code. Disabling the referential integrity rule checking may lead to an inconsistent database.

Accordingly, what is need is an improved technique for automatically ordering operations to be performed on a relational database.

SUMMARY OF THE INVENTION

An object of the present invention is to provide a technique for programmatically ordering operations that are to be performed on a relational database in order to avoid referential integrity constraint violations.

A further object of the present invention is to provide this ordering technique such that the efficiency of relational database operations is increased.

Another object of the present invention is to provide this programmatic ordering technique where the ordering uses the referential integrity constraints defined for the affected tables.

Still another object of the present invention is to provide a programmatic ordering technique that enables batch mode processing, whereby multiple relational database store operations can be performed at a time, thereby reducing the number of round-trips between the application and the database engine and thus increasing the efficiency of the overall system.

Yet another object of the present invention is to provide a programmatic ordering technique that is not limited to use with object-oriented applications.

Another object of the present invention is to provide a programmatic ordering technique that can be used outside the scope of the application program which generates the database modifying operations, thereby enabling the application itself to remain unchanged.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for increasing the efficiency of operations to be performed against a relational database while avoiding referential integrity constraint violations. This is achieved by using a technique which programmatically orders the operations to be performed. The technique comprises: determining an insert order among a plurality of tables of the database; determining a delete order among this plurality of tables; clustering a plurality of modifications to be made to the database according to an operation to be performed by each of the modifications and according to a particular one of the tables which is to be affected by each of the modifications; and applying the clustered modifications to the database. Applying the clustered modifications further comprises: first applying all of the clustered modifications for which the operation is insert, according to the insert order; next applying all of the clustered modifications for which the operation is update; and last applying all of the clustered modifications for which the operation is delete, according to the delete order. The clustered modifications for which the operation is update may be applied in an arbitrary order.

Determination of the insert order and of the delete order may be performed at a time prior to the clustering and applying of modifications.

This technique may operate at a relational database engine. It may also operate separately from an application program which generates the modifications.

The clustering and applying of modifications may be performed repeatedly for each of a subsequent plurality of modifications. Application of the modifications may be performed in a batch-write mode.

Determining the insert order may further comprise: identifying, for each selected one of the tables, one or more related tables; determining, among the selected table and each of the related tables, an insert precedence; and ordering the selected table before the related tables for which the selected table has insert precedence, and ordering the selected table after the related tables for which the selected table does not have insert precedence.

Determining the insert precedence may further comprise: determining, for the selected table and each particular one of the related tables, whether a relationship between the selected table and the particular related table has a constraint; determining, when the constraint exists, whether a foreign key of the constraint is located in the particular related table; concluding that the selected table does not have insert precedence when the constraint does not exist or when the foreign key is not located in the particular related table; and concluding that the selected table does have insert precedence when the foreign key is located in the particular related table.

Determining the delete order may further comprise: identifying, for each selected one of the tables, one or more related tables; determining, among the selected table and each of the related tables, a delete precedence; and ordering the selected table before the related tables for which the selected table has delete precedence, and ordering the selected table after the related tables for which the selected table does not have delete precedence.

Determining the delete precedence may further comprise: determining, for the selected table and each particular one of the related tables, whether a relationship between the selected table and the particular related table has a constraint; determining, when the constraint exists, whether a foreign key of the constraint is located in the selected table; concluding that the selected table does not have delete precedence when the constraint does not exist or when the foreign key is not located in the selected table; and concluding that the selected table does have delete precedence when the foreign key is located in the selected table.

The present invention will now be described with reference to the following drawings, in which like reference numbers denote the same element throughout.

BRIEF DESCRIPTION OF THE DRAWINGS

FIG. 3 shows a simple example of data values stored in relational database tables, according to the prior art;

FIG. 4 shows a simple example of modifications to be made to the stored data of FIG. 3;

FIGS. 5 and 6 illustrate examples of the table ordering to be performed according to the present invention;

DESCRIPTION OF THE PREFERRED EMBODIMENT

Figure 1:
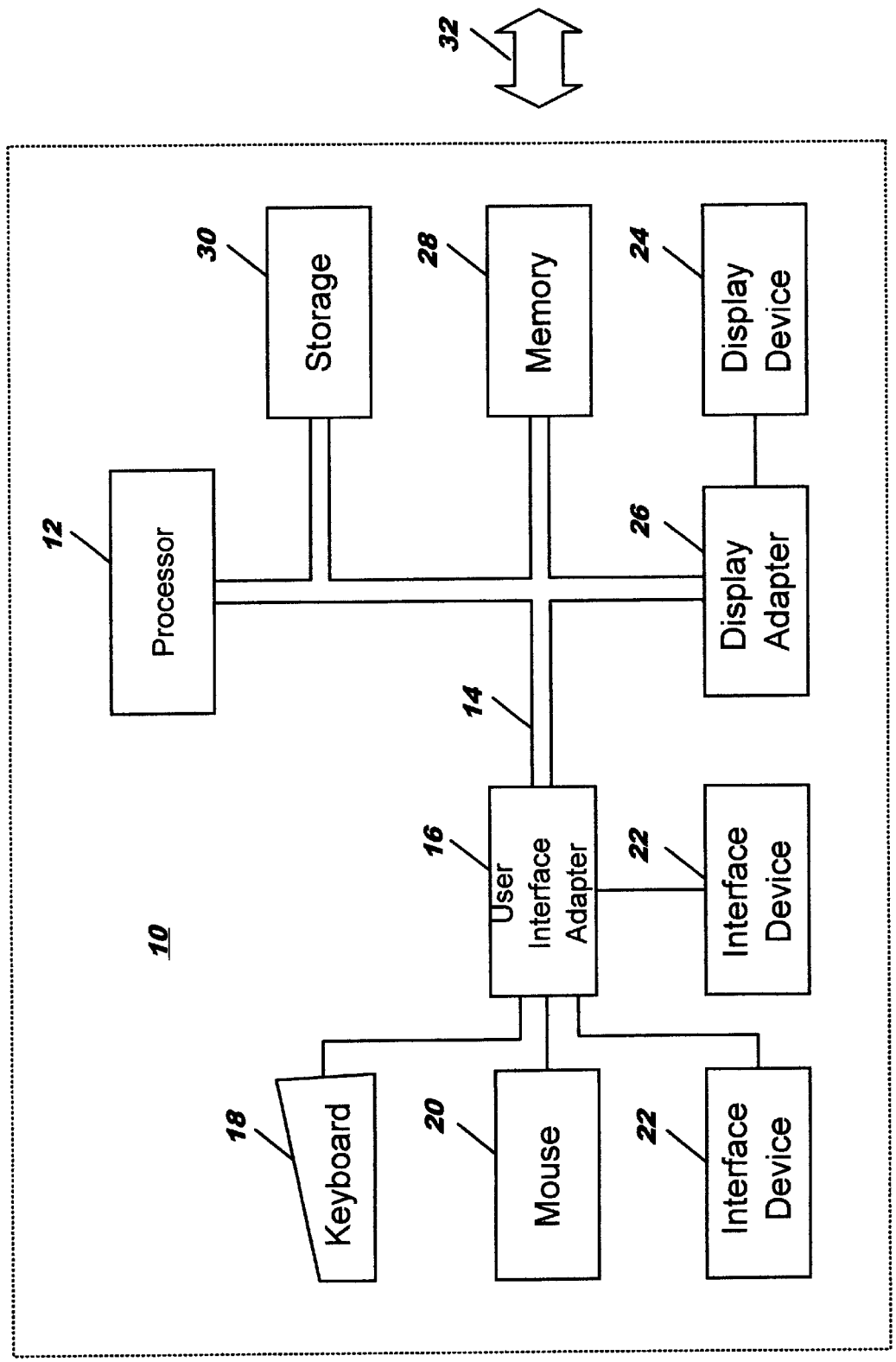
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a LAN or a WAN, or the workstation 10 can be a client in a client/server arrangement with another computer, etc. All of these configurations, as well as the appropriate communications hardware and software, are known in the art.

Figure 2:
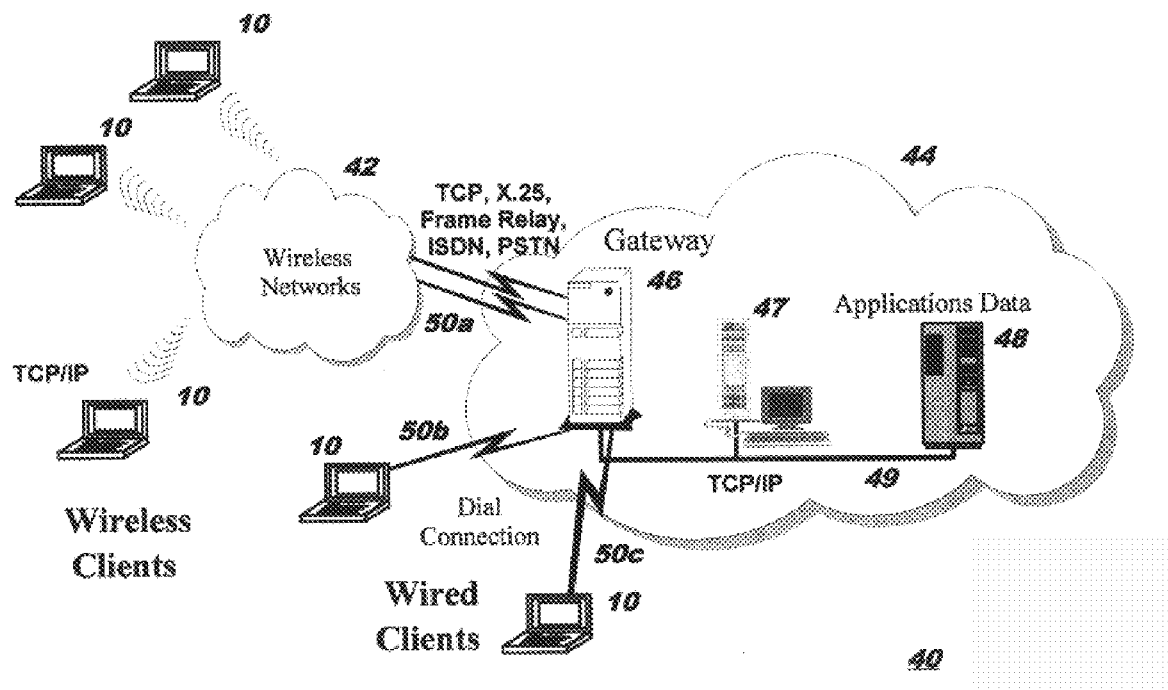
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 or server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with those various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

The present invention defines a technique for programmatically ordering insert, update, and delete operations according to the referential integrity constraints defined for an arbitrary underlying relational database when rows are to be stored to or deleted from the database. An ordering algorithm is defined herein which utilizes the relationship information defined between relational tables in the database, described by primary key column to foreign key column pairs, and the integrity rules for these column pairs.

The computing environment in which the present invention may be used includes an Internet environment, an intranet environment, an extranet environment, or any other type of networking environment. These environments may be structured using a client-server architecture, or a multi-tiered architecture. The present invention may also be used in a disconnected (i.e. stand-alone) mode, where ordering of operations is performed on the same machine at which the database engine is located or where ordering of operations is performed prior to connecting to a network for transmitting the resulting ordered operations to a database engine.

The preferred embodiment of the present invention will now be discussed with reference to FIGS. 3 through 12.

In the preferred embodiment, the present invention is implemented as one or more computer software programs. The implementation of the software of the present invention may operate on a server or intermediary device in a network, as one or more modules (also referred to as code subroutines, or "objects" in object-oriented programming).

Alternatively, the software may operate on a user's workstation, without deviating from the inventive concepts disclosed herein. The present invention may be used by any system accessing a relational database, as well as by the relational database engine.

An implementation of the present invention may execute (i) exclusively at run-time, or (ii) partly as a preprocessing step which executes prior to run-time (e.g. at development time) and partly at run-time. In either case, the set of (unordered) modifications created by an application are ordered using the present invention before being applied to the database. The ordering may be applied at the server on which the database engine resides, after receiving the set of modifications from the client machine. Or, the ordering may be applied at the client machine such that an ordered set of modifications can be sent to the server for direct application by the database engine. Case (i) includes the situation where the ordering technique is performed after an application has completed execution, to order and apply the modifications which have been generated by the application. In case (ii), the ordering relationships among the tables used by a particular application may be determined programmatically, according to the present invention, before using the application to generate modifications.

FIG. 3 illustrates a simple example of data values stored in relational database tables, according to the prior art. This example will be used to illustrate operation of the present invention. For the example, the tables of interest are Company 300, Department 310, Employee 320, Spouse 330, and Address 340 tables. Each row 301, 302 in the Company table 300 contains information for a single company. The Company table 300 is organized by company number 303, which serves as the primary key for accessing the table and therefore is a unique element of each row. In this example, each row also has a field (illustrated as a column) for the company's name 304. Department table 310 is organized by department number 315, which is the primary key for this table. Each row 311, 312, 313, 314 has fields for the department's name 316 and the company number 317 of the company in which this department exists. The company number field 317 is a foreign key in this example, linking each department row with the row from the Company table 300 representing the associated company. Similarly, Employee table 320 has employee number 325 as its primary key, and has foreign keys 327, 328 linking the rows of this table to the Department table 310 and Spouse table 330. Spouse table 330 has spouse identifier 335 as its primary key, and does not contain any foreign keys. Address table 340 uses address identifier 345 as its primary key, and contains a foreign key 347. Values of this foreign key field 347 point back to rows of the Employee table 320, identifying the employee for whom this address is defined. (It will be obvious to one of ordinary skill in the art that the tables used in FIG. 3 have been simplified to illustrate the present invention, and that tables used for actual applications will typically have many more fields and many more rows than those shown in FIG. 3.)

There are three kinds of relational operations that can be performed on database rows, as previously described: insert, update, and delete operations. The dependencies between these operation types are:

(1) Insert operations can be dependent on other inserts (i.e. a row to be inserted refers to another row to be inserted), but not on any other kind of operations. As an example of dependencies among inserts, suppose employee information for employees in a new department is to be inserted into the database illustrated in FIG. 3. Because the Employee table 320 has a dependency on the Department table 310 for the foreign key column 327, the new department row must be inserted before the new employee rows for this department.

(2) Update operations are not dependent on other updates, but they can be dependent on inserts (i.e. a row is to be updated to refer to a row to be inserted) As an example of dependencies between updates and inserts, suppose the database illustrated in FIG. 3 is to be modified because employee 00050 (in row 322) has moved from department E01 to department E10, where department E10 is a new department to be inserted. In this case, the new department E10 row must be inserted before the update for the employee row 322 can be performed.

(3) Delete operations can be dependent on other deletes (i.e. a row to be deleted refers to another row to be deleted), and they can be dependent on updates (i.e. a row is to be updated to de-reference a row to be deleted). As an example of dependencies among deletes, suppose department E01 and all of its employees are to be deleted. Maintaining referential integrity requires that the employee rows are deleted first, and then the department row can be deleted. As an example of dependencies between deletes and updates, suppose department E01 is to be deleted but its employees are not. In this case, all the employee rows (322 and 323, in this example) of this department must be modified to change their department column 327 value before the delete of the department row 312 can occur.

The precedence relationships between different database operations for the tables of a particular database form complex prerequisite trees. However, these prerequisites do not need to be completely resolved to be able to determine the right order for the operation execution. Instead, the prerequisites need to be resolved in detail only among the insert operations and among the delete operations and at a high level among the different operation types, but do not need to be individually resolved across the different operation types. Resolving the operations at a high level among the operation types requires simply executing the operations in three phases: first the insert operations, then the update operations, and finally the delete operations. It can be seen that this order aligns with the dependencies between operation types described above. Thus, it is safe to execute the update operations after executing the insert operations because all the rows that could possibly be referred to by the updated rows will already be in the database. The delete operations can be executed after the update operations because any possible de-referencing would have taken place during the update phase.

For determining the detailed ordering among insert operations, the important criteria are the table into which a row is to be inserted and the table(s) referred to by foreign keys in this row. The term "referring" row or table is used hereinafter to describe the former, and the term "referred" row or table is used to describe the latter. Using the example of FIG. 3, where the Department Number foreign key 327 is used in the Employee table 320 to indicate the relationship "Employee X works-in Department Y", a row to be inserted into the Employee table 320 has the Employee table as the referring table and the Department table 310 as a referred table. Thus if a new employee 00011 is to be inserted into a new department E11 (as shown in FIG. 4A, discussed in more detail below), the referring row is row 410 and the referred row is row 420. Accordingly, row 420 must be inserted into the database before row 410 is inserted.

In the general case, this ordering requirement for inserts is described as "When inserting rows, the row being referred to in table A must be inserted before the referring row in table B.". If all referred rows have been inserted into table A, then it is safe to insert any referring row into table B, because all rows in table A that possibly could be referred to by the rows in table B are now in the database. Therefore the insert operations may be performed one table at a time: first insert all referred rows into table A and then insert all referring rows into table B. Thus the detailed insert precedences need only be resolved among tables rather than among individual rows when using the technique of the present invention.

The ordering requirement for deletes is described as "When deleting rows, the referring row in table B must be deleted before deleting the row being referred to in table A.". If all referring rows have been deleted from table B, then it is safe to delete any referred row in table A, because all rows in table B that possibly could refer to the rows in table A are now removed from the database. Therefore the delete operations may be performed one table at a time: first delete all referring rows from table B and then delete all referred rows from table A. Thus the detailed delete precedences need only be resolved among tables rather than among individual rows when using the technique of the present invention.

The ordering technique defined by the present invention first determines the ordering requirements among the tables which are to be affected (using the rules defined above for referred and referring tables), for each of the operations of inserting rows and deleting rows. This results in an ordered insert table list and an ordered delete table list (as illustrated by elements 510 and 520, respectively, in FIG. 5). The rows that are to be affected are then clustered according to the tables to be modified and the type of database operations to be performed. That is, the insert operations are clustered or segregated by table, the update operations are segregated (by table, according to the preferred embodiment, although this is not strictly required), and the delete operations are segregated by table. This results in three lists for each table: a list of rows to be inserted, a list of rows to be updated, and a list of rows to be deleted. (As will be obvious, the individual table lists for each operation type may be combined into three overall lists, where the resulting insert and delete lists are ordered according to the ordered insert table list and delete table list.)

Tables that have update operations do not need operation ordering, as stated above. For insert and delete operations, a nearly identical algorithm (which is described in detail below with reference to FIGS. 5 and 8–10) is used by the preferred embodiment to resolve the detailed prerequisites among tables. In each case, the ordering algorithm uses two lists of tables: the original unordered list (referred to equivalently herein as an unsorted list) of tables for which modifications are to be performed, and an ordered table list (referred to equivalently herein as a sorted list). Initially, the ordered table list is empty. The ordering algorithm iterates over the tables in the unordered list. Each iterated table (referred to as the "current table") is first added to the end of the ordered table list. The algorithm then iterates over the relationships (i.e. foreign keys to or from) that the current table has with other tables. For each such relationship, the algorithm tests if the current table has either insert precedence (when performing insert ordering) or delete precedence (when performing delete ordering) over the relationship. If the current table has precedence over the relationship and the related table is already included in the ordered list (in a position before the current table), each related table and its lower precedence related tables are recursively moved to the end of the list. Upon completing the ordering algorithm, the order of tables in the ordered list corresponds to the referential integrity rules defined in the database: i.e. the sorted insert list prescribes the order in which the insert operations must be performed, and similarly for the sorted delete list.

The current table has insert precedence over a relationship if the related table has a foreign key column which refers to the primary key column in the current table, and there is a constraint defined for this primary-key-column/foreign-key-column pair. The current table has delete precedence over a relationship if the current table has a foreign key column which refers to the primary key column in the related table, and there is a constraint defined for this primary-key-column/foreign-key-column pair.

After the ordering and clustering phases have completed, the rows can then be inserted, updated, and deleted according to the orders in the sorted table lists.

Operation of this process will now be described with reference to an example. FIG. 4A illustrates modifications that may be performed on the sample data of FIG. 3, and FIG. 4B shows these modifications after ordering according to the present invention. FIG. 5 illustrates an example of the table ordering to be performed according to the present invention, using a subset of the example tables from FIG. 3, and the operation lists created for each table.

FIG. 4A shows 7 representative modifications 410–440 that may be made to the data in the 5 tables of FIG. 3. Note that the tabular format used in FIGS. 4A and 4B is for purposes of illustration, and is not intended to depict a structure to be used with the present invention. Note further that only a subset of the data values for each modification has been included, where that subset illustrates the pertinent information used by the present invention. As can be seen in column 405 of FIG. 4A, the operation types created by a typical application will be intermingled. After ordering by the present invention, the operations are clustered into a first ordered group (420, 410, 435) for inserts, then an unordered group for updates (which in this example has only a single modification 415), and finally an ordered group (440, 430, 425) for deletes.

Column 406 of FIG. 4A identifies the table name which is to be affected by the modification, and column 407 specifies the primary key value for that table. Thus in row 410, a new employee having primary key value 00011 (for the employee number column 325) is to be inserted into the Employee table 320. Column 408 specifies the value of foreign key column 327 that is to be used for this new employee, and column 409 identifies the table in which this foreign key is defined as a primary key. (The additional foreign key column 328 for table 320 has been omitted from row 410 as a simplification, but is processed in an analogous manner to that of foreign key column 327, as will be described in detail with reference to the logic of FIGS. 7–11.) The final two entries in row 410 therefore indicate that this new employee is to be a member of Department E11. Note that FIG. 3B does not contain a row for this department number, and thus attempting to insert row 410 directly into the database would violate the referential integrity constraints. Row 420 of FIG. 4A, however, is an insert operation that will create this department in table 310. Accordingly, the ordering operation of the present invention programmatically causes the insert operation of row 420 to take place before the insert operation of row 410, as shown by the first two ordered rows (420, 410) of FIG. 4B, thereby avoiding the violation. The remaining insert operation 435 adds a new employee having employee number 00012, where this employee is defined as being in department E21. Because this department number is already defined in table 310, the insert of row 435 will not cause a constraint violation. This insert row 435 is depicted in FIG. 4B as the third of the ordered insert operations. It is important to note, however, that an exact ordering among inserts (and among deletes) is not required: the ordering requirement is by table and not by individual modifications to a particular table. Therefore, the ordering among rows 410 and 435 (and any other updates to the Employee table) is not significant.

The update operation 415 appears in FIG. 4B after the insert operations 420, 410, 435 to indicate that, according to the present invention, the updates are performed after the inserts and before the deletes. Ordering among multiple updates (although multiple updates have not been illustrated in the example) is not required.

The final group of ordered modifications are the deletes. The unsorted modification list in FIG. 4A contains 3 deletes 425, 430, 440. When deleting rows from the database, the foreign key of interest is different than when inserting rows. For a row to be deleted, there cannot be any rows of other tables which specify, as their foreign key, the primary key of the row to be deleted. An asterisk has been used in FIG. 4A to show this dependency. In row 425, for example, the department having department number E31 is to be deleted from table 310. By inspection of the remaining tables of FIG. 3, it can be seen that the Employee table 320 has a row 324 which uses E31 as its foreign key 327. Columns 408 and 409 of row 425 are therefore intended to signify that this delete operation is dependent on the row for employee 00320 in the Employee table 310, and thus performing the delete operation would violate the referential integrity constraints of the database. If the employee record for employee 00320 is deleted first, however, then the delete of department E31 does not result in this violation. Row 430 of FIG. 4A specifies a delete of this employee, and thus the programmatic ordering operation of the present invention changes the order among these two deletes as shown in the ordered rows 430, 425 of FIG. 4B. Deleting the employee 00320 row, however, would cause its own constraint violation. As shown in columns 408 and 409 of row 430, this employee 00320 has a dependency relationship with a row from the Address table 340, because row 341 (using primary key value AD001) references this employee from its foreign key column 347. Row 440 of FIG. 4A is a delete operation for this address row 341. Because no rows of the tables in FIG. 3 are dependent on this address row 341, columns 408 and 409 have been left blank to indicate that there is no prerequisite for this delete operation 440. The final order for the 3 delete operations is therefore 440, 430, 425, as shown in FIG. 4B, where this order has been determined based on the relationships between the Address, Employee, and Department tables.

Considering the Employee, Address, and Department tables as a subset from the database example of FIG. 3 (and ignoring the remaining tables and foreign keys), FIG. 5 illustrates how ordering among these tables is performed according to the present invention. As just discussed with reference to the example operations of FIG. 4, dependency relationships exist among these tables because of their foreign keys 327 and 347. Using the referred/referring table order for inserts, the present invention determines that the proper ordering for inserts is Department 511 first, then Employee 512, and finally Address 513. Using the referring/referred table order for deletes, the ordering of these tables reverses to Address 521, Employee 522, and Department 523. FIG. 5 also illustrates that 3 operation lists are created for each table. With reference to the modifications to be performed on the Employee table 501, the 3 lists are: list 531 containing all the employee information to be inserted; list 532 for the employee updates; and list 533 for the employees to be deleted. Similar lists 541–543 and 551–553 are created for the Address table 502 and Department table 503, respectively. Within the individual lists, no ordering is necessary, thereby making operation of the present invention a very efficient solution for maintaining referential integrity.

Figure 6A:
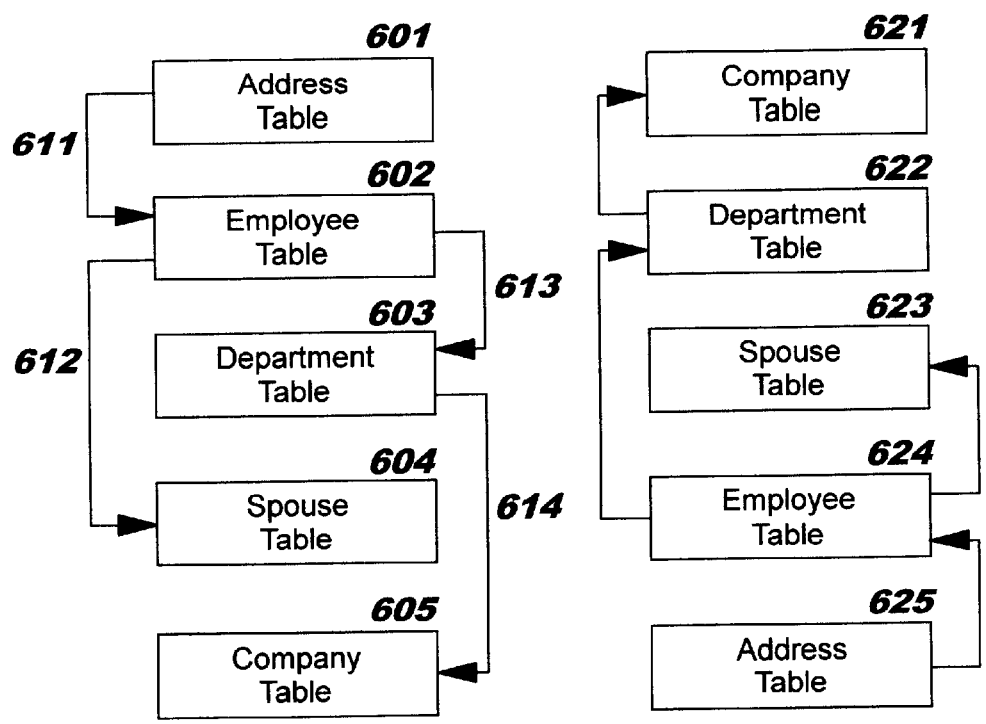
Figure 6B:
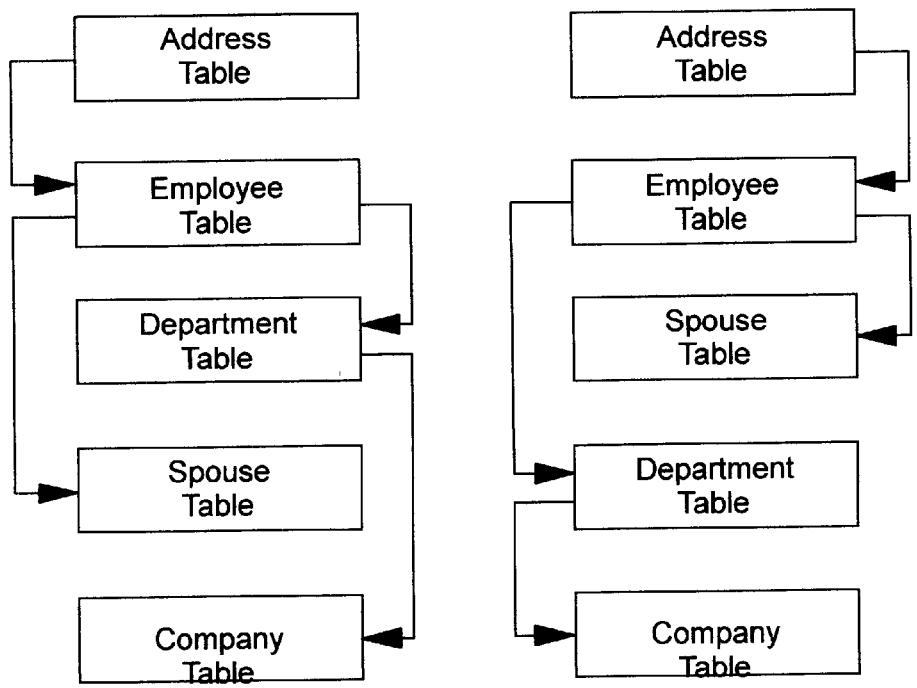

FIGS. 6A and 6B depict the insert ordering and delete ordering, respectively, that would be performed using the entire set of 5 tables from the example database of FIG. 3, and all the foreign key relationships depicted therein. Assume an application program creates a group of operations in the order shown in the leftmost column of these figures, such that the operations affecting the Address table are first (601), followed by operations on the Employee (602), Department (603), Spouse (604), and Company (605) table. Arrows 611–614 indicate the foreign key relationships between these tables, according to the example of FIG. 3. As can be seen by inspection, the referred/referring rule of the present invention requires that the table order for applying insert operations is Company 621, Department 622, Spouse 623, Employee 624, and Address 625. The delete order, as shown in the rightmost column of FIG. 6B, then places these tables in the reverse order.

The logic which may be used to implement the preferred embodiment of the ordering technique of the present invention will now be described in detail with reference to FIGS. 7–12, and the example tables of FIG. 5. For purposes of this discussion, the modifications to be made (inserts, updates, and deletes) are referred to as "tuples" of information.

Figure 7:
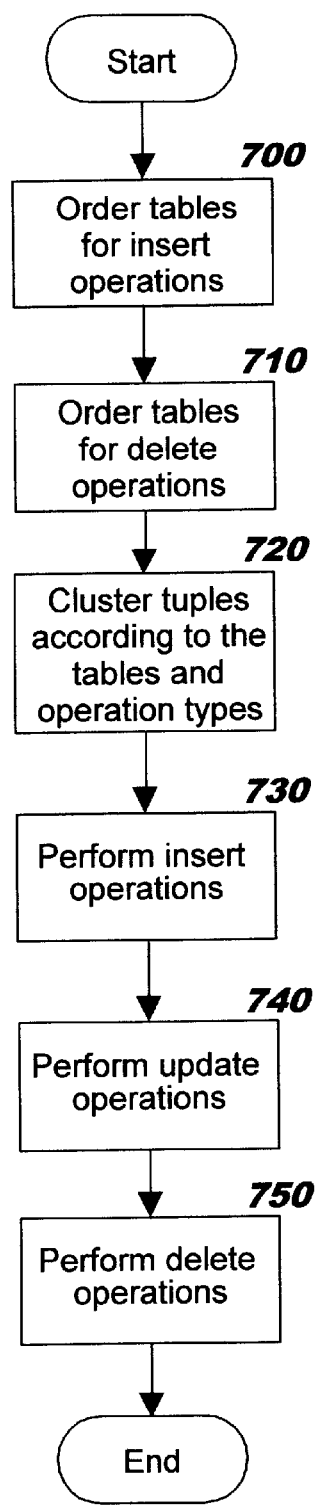
FIGS. 7–11 provide flowcharts illustrating the logic with which the preferred embodiment of the present invention may be implemented.
Figure 11:
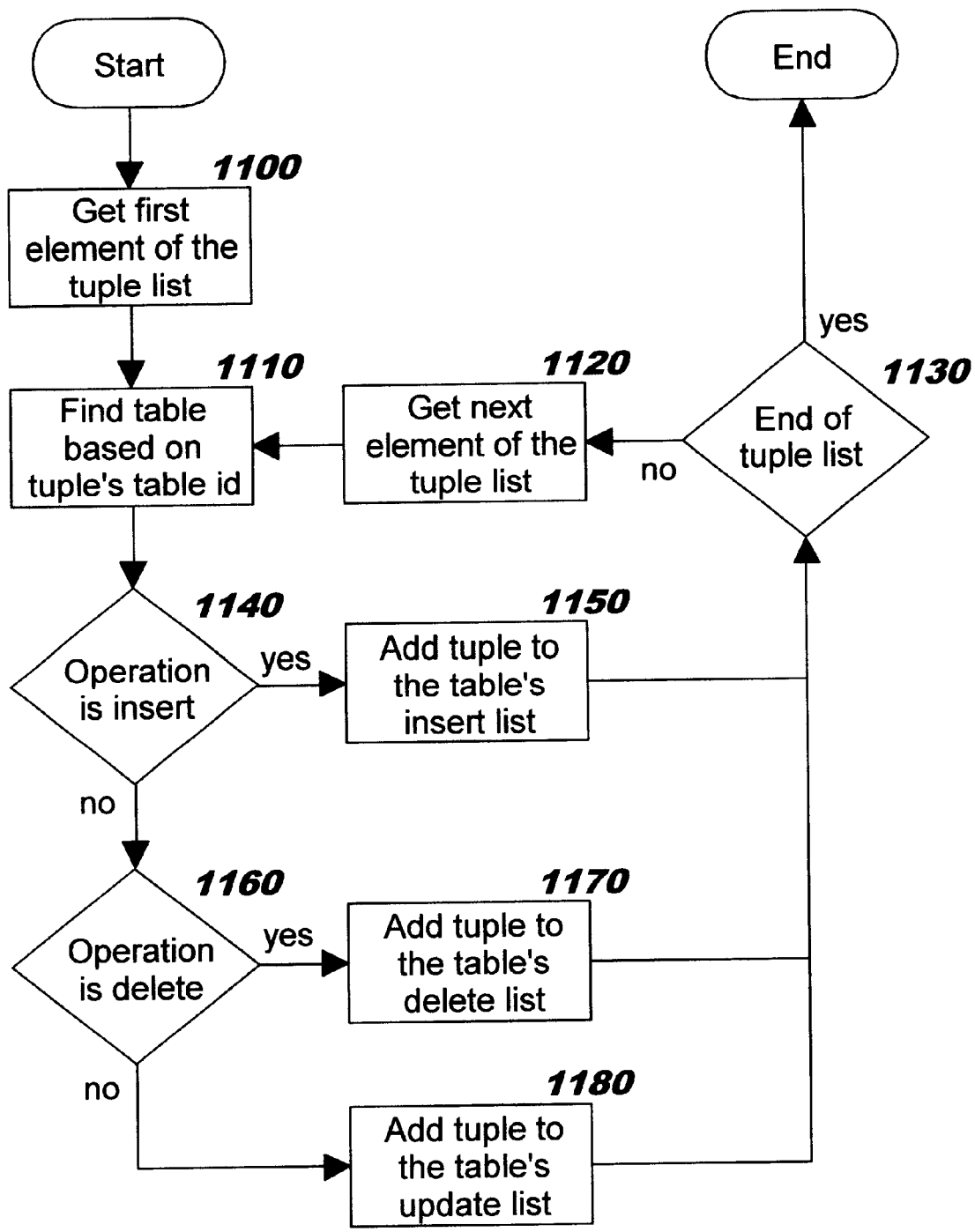

FIG. 7 depicts the logic of the main, high-level flow of the preferred embodiment of the ordering technique of the present invention. Processing begins at Block 700, where the table order to be used for inserts is determined. This process is described in detail by FIG. 8. With reference to the diagram of FIG. 5, Block 700 creates the insert ordering information 511, 512, 513. The table order to be used for deletes is then determined (Block 710), where the delete ordering is also described by the logic of FIG. 8. The delete ordering information 521, 522, 523 of FIG. 5 is thereby created. (As will be obvious, the order of performing Blocks 700 and 710 may be reversed without altering the outcome.) The tuples which have been created by an application program are then clustered by table and operation type (Block 720). FIG. 11 describes this process in detail. With reference to the diagram in FIG. 5, the clustering of Block 720 puts the tuples into the appropriate list 531–533, 541–543, or 551–553. Preferably, these lists will be created using linked list structures. Now that the tuples have been ordered such that referential integrity constraints will not be violated, Blocks 730, 740 and 750 apply the operations of inserting, updating, and deleting rows (in this particular sequence) in the database. Note that while FIG. 7 depicts the processing of Blocks 720–750 as occurring only once, an implementation for a particular application may choose to iteratively repeat these blocks. For example, an application that is driven by a user making changes interactively may periodically apply the generated modifications to the database such that control returns from Block 750 to Block 720 of FIG. 7 until the application is terminated. As another example, when used with a transaction-oriented application, the processing of Blocks 720–750 may be performed upon completion of each transaction to apply the modifications generated during the transaction's scope. It will be obvious to one of ordinary skill in the art how FIG. 7 may be changed to implement this alternative iterative approach.

Note that for the individual tuples of each operation type, application of the modifications may be performed using the techniques of the prior art, and thus the logic of Blocks 730, 740 and 750 has not been described in detail. That is, once the insert operations have been properly ordered by table, each insert can be applied in sequence using existing techniques, and similarly for the updates and deletes. An advantage of the present invention is that batch-mode store operations, whereby multiple operations are written into the database at once, can be performed. While batch-mode write capability exists in the prior art, it is seldom used with database tables having referential integrity constraints because of the absence of techniques in the prior art for programmatically determining how to order the multiple write operations for an arbitrary group of tables to avoid violating the constraints (and because manually coding logic to implement the ordering for a particular set of tables can be extremely difficult and error prone).

Figure 8:
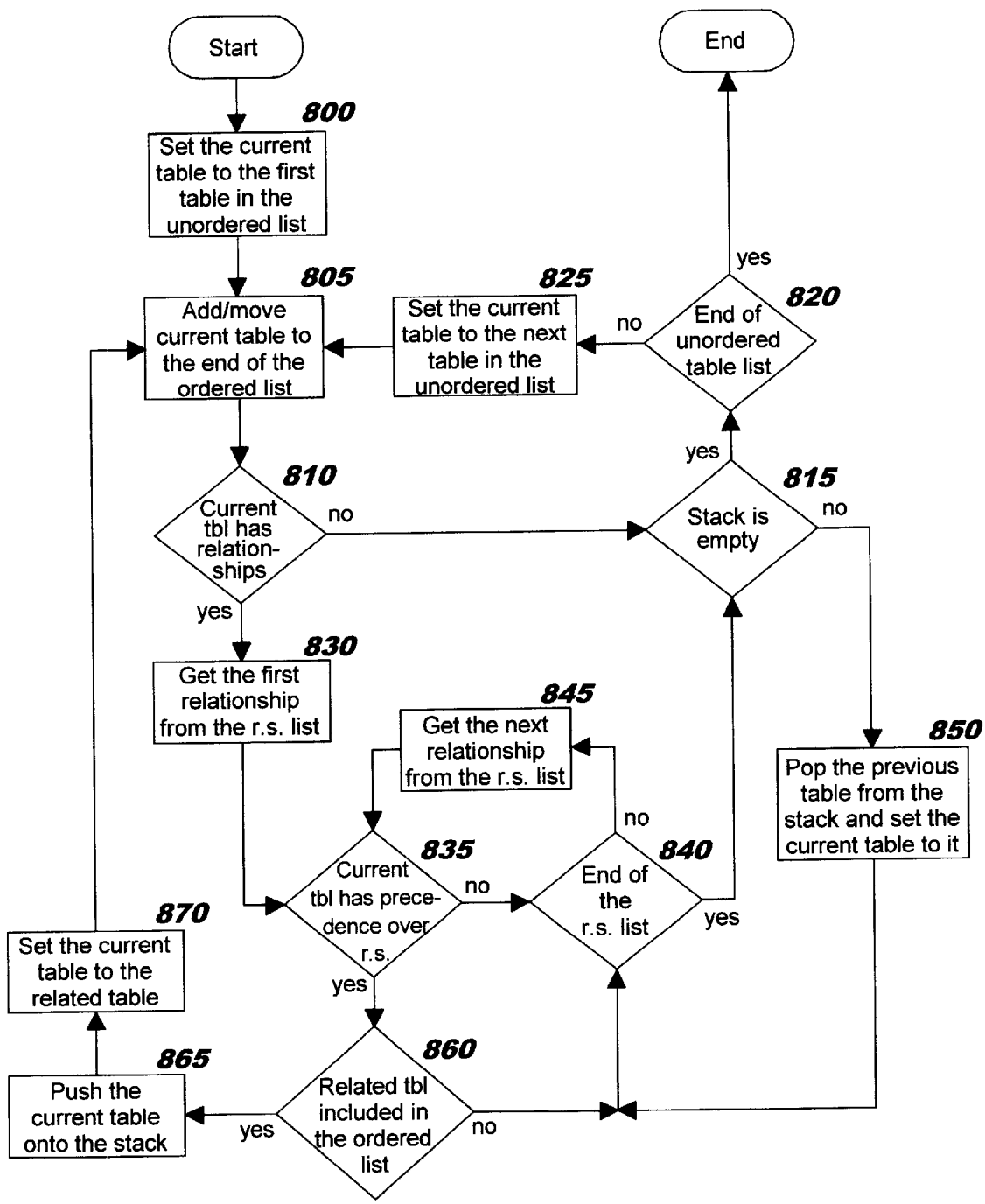
Figure 9:
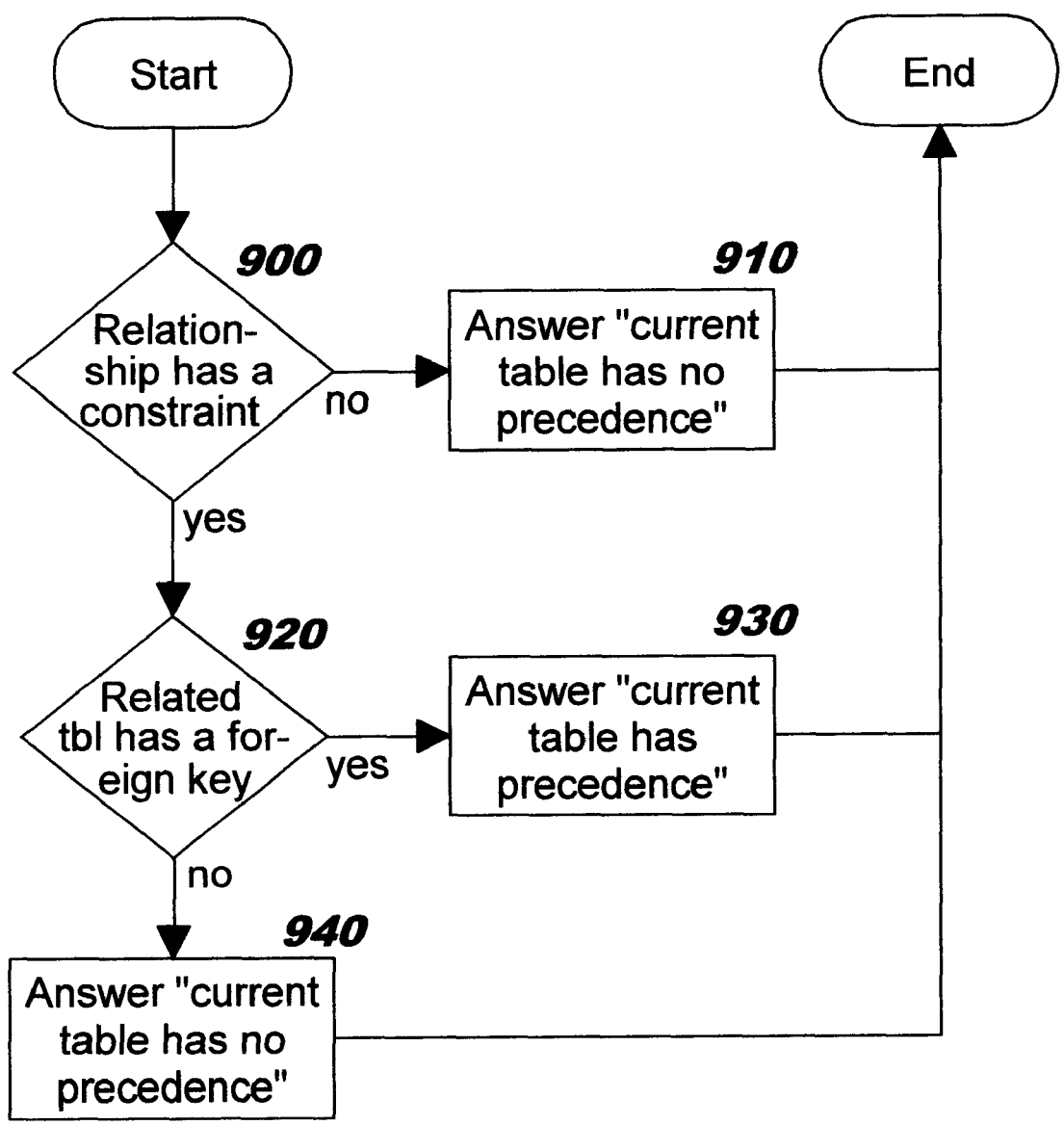
Figure 10:
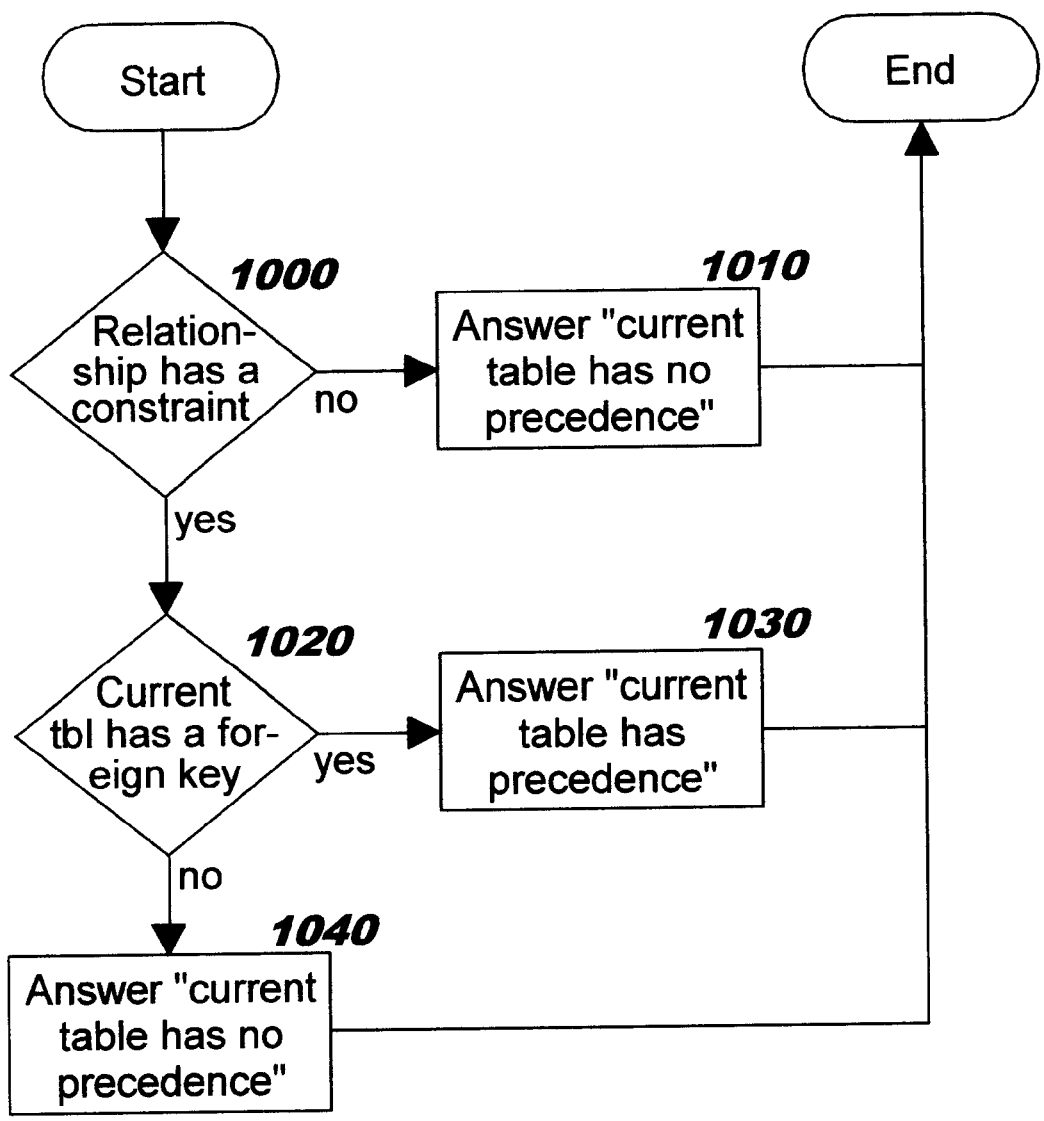

The logic of FIG. 8 depicts the preferred embodiment of the logic used to determine the proper table ordering that will avoid violating referential integrity constraints, according to the present invention. FIG. 9 provides an algorithm to determine the precedence of tables for the insert operation, which is used when FIG. 8 is invoked from Block 700 of FIG. 7. FIG. 10 provides a similar algorithm to be used to determine precedence of tables for the delete operation, and is used when FIG. 8 is invoked from Block 7 10. These different algorithms are preferably selectively invoked from Block 835, for example by setting a flag that indicates whether the FIG. 8 logic has been invoked for processing inserts or for processing deletes. (Alternatively, the logic of FIG. 8 may be duplicated for inserts and for deletes, in which case the logic of FIGS. 9 and 10 may be embedded within the applicable copy.)

The processing of FIG. 8 begins with an unordered list of input tables against which modifications are to be applied. (This information may be extracted from the generated tuples, or from knowledge of the database schema.) With reference to the diagram in FIG. 5, assume that the original unsorted table order is Employee 501, Address 502, and Department 503. (As described above, the resulting order for inserts will be 511, 512, 513, and the resulting order for deletes will be 521, 522, 523.) Block 800 sets a current table pointer to point to the first table from this unordered input list. Block 805 adds this table identifier to the end of an ordered list which is to be generated as the output of FIG. 8 (and which is initially empty). In the example of FIG. 5, the current pointer then points to the Employee table, the unordered list now contains only Address and Department, and the ordered list contains Employee.

Figure 12:
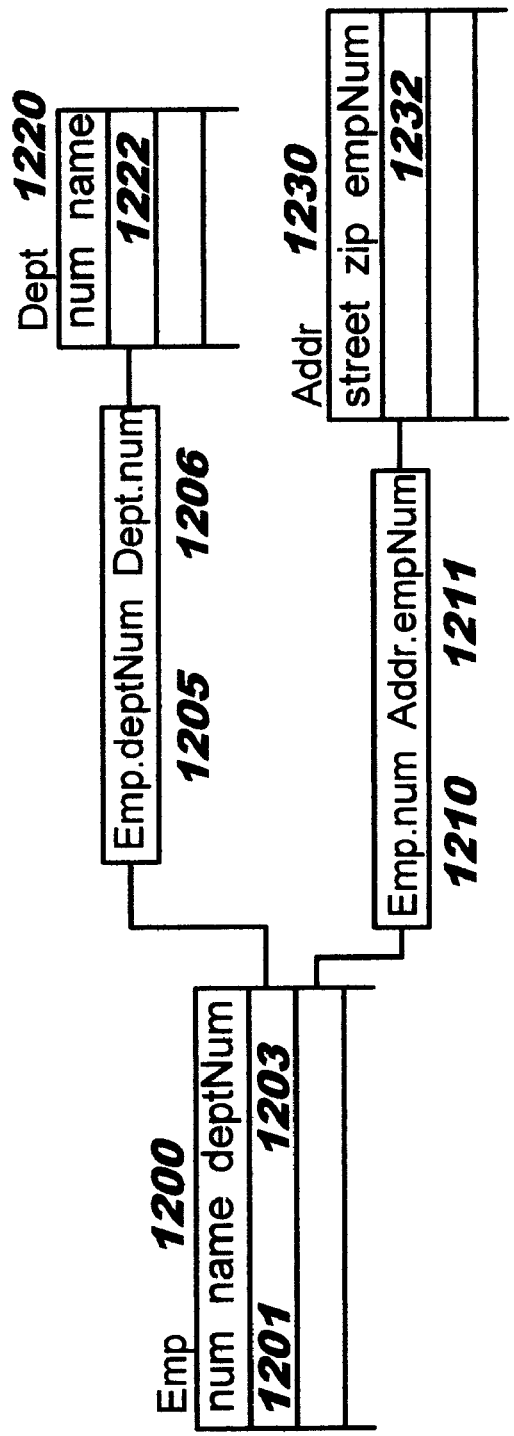
FIG. 12 illustrates relationship information that is available for a database schema according to the prior art.

Block 810 checks whether the current table has any relationships. As used herein, "relationships" refers to foreign keys defined as existing within the current table, as well as foreign keys which are defined in other tables and which reference the current table. Thus for the current Employee table, there are 2 relationships—one with Department, and one with Address—and Block 810 will therefore have a positive result. Control then passes to Block 830, which gets the first relationship involving the current table from a relationship list (referred to in FIG. 8 as the "r. s. list") for the tables of the current database schema. This relationship list may be unordered, and is available using techniques which are known in the art for determining the relationships among tables in a particular schema. FIG. 12 illustrates a schema corresponding to the tables and relationships of FIG. 5, where a first relationship 1205, 1206 is defined between column 1203 of table 1200 and column 1222 of table 1220 and a second relationship 1210, 1211 is defined between column 1201 of table 1200 and column 1232 of table 1230.

When there are no relationships for the current table, there are no ordering constraints that need to be evaluated, and thus control simply transfers from Block 810 to Block 815. Operation of the detailed ordering logic for this table is thereby bypassed, leaving the table in place on the ordered output list.

In the example, assume that the first (and therefore current) relationship involving Employee is between Employee (the "current" table) and Department (which is thus the "related" table). Block 835 then invokes the logic of FIG. 9 or FIG. 10, depending on whether insert or delete processing is being performed, to determine whether the current table has precedence over the current relationship.

For the case where insert processing is performed, Block 900 of FIG. 9 will be performed next. Block 900 asks whether the current relationship has a constraint. For the example Employee to Department relationship, there is a constraint on the department number (using foreign key column 327). Thus Block 900 has a positive result, and control transfers to Block 920. (When there is no constraint, Block 900 has a negative result and Block 910 returns a negative answer to the invoking logic of FIG. 8.) Block 920 then checks whether the related table has the foreign key for the current relationship. In the example, the foreign key is in the Employee table, which is the current table, and not in the related Department table, so that Block 920 has a negative result. When the result is negative, Block 940 returns a negative answer to Block 835. (Otherwise, Block 930 returns a positive answer.)

As can be seen by comparison, the delete processing of FIG. 10 is nearly identical to the insert processing of FIG. 9. The delete processing also checks whether there is a constraint for the current relationship (Block 1000), and returns a negative answer to Block 835 if there is none. The test in Block 1020, however, asks whether the foreign key for the current relationship is in the current table, whereas Block 920 asked whether it was in the related table. Thus when performing delete processing for the unordered tables 501, 502, 503, and evaluating the Employee to Department relationship (which has been described above with reference to FIG. 9), Block 1020 will have a positive result because the foreign key 327 used by the relationship exists in the current (Employee) table. The remaining logic of FIG. 10 is identical to that of FIG. 9.

Returning now to the processing of Block 835 in FIG. 8, if a negative answer is returned from FIG. 9 (or FIG. 10, when processing deletes), control transfers to Block 840 which checks to see if all the relationships of the current table have already been processed (i.e. if the end of the relationship list has been reached). Otherwise, control transfers to Block 860. Because the Employee to Department relationship returns a negative result for insert processing, Block 840 will execute in the example after control returns to Block 835. Block 840 will have a negative result at this point, because there is another relationship involving the current Employee table, which is the relationship between the Employee and Address tables. Block 845 therefore gets this relationship from the relationship list, after which Block 835 determines whether the current table has precedence in this particular relationship. Referring again to FIG. 9 for insert processing, the current Employee to Address relationship has a constraint, and therefore the test in Block 900 has a positive result. In this case, the relationship being evaluated uses the foreign key 347 in Address table 340. The Address table is the related table on this invocation of FIG. 9, and thus Block 920 has a positive result, causing Block 930 to return a positive answer to Block 835.

Returning again to Block 835, the positive result returned for the second relationship evaluation of the example causes control to transfer to Block 860. Block 860 asks whether the related table is already included in the ordered list being created. At this point in the example, the ordered list contains only the Employee table, and not the related Address table, so Block 860 has a negative result and control returns to Block 840. Block 840 again checks to see if there are any more relationships for the current table on the relationship list which have not yet been evaluated. When there are no more to evaluate, as is true at this point in the example, control transfers to Block 815 which checks whether a stack being used by FIG. 8 is empty. Not having pushed anything onto the stack yet, the test has a positive result in the example, and processing continues at Block 820. Block 820 asks whether the unordered input list is empty, which is true when it has been completely processed. If the result of this test is positive, the operation of FIG. 8 is complete for the insert or delete processing for which it was invoked, and control returns to the invoking logic in FIG. 7.

When Block 820 has a negative result, there are more tables to be processed from the unordered input list. Block 825 therefore sets the current table pointer to point to the next table from the unordered list, and Block 805 moves the table from the unordered list to the end of the ordered output list being created. In the example, the current table pointer now points to the Address table, the unordered list contains only the Department table, and the ordered list contains the Employee and Address tables. (As will be obvious to one of ordinary skill in the art, references herein to "moving a table" from one list to another are intended as a shorthand notation for moving an identifier of the table, or equivalently, moving a pointer to the table or its identifier.) The current table (Address) has a single relationship, to the Employee table, and thus Block 810 will have a positive result. Blocks 830, 835, 840, 815, and 820 will then execute, as has been described, where Blocks 900, 920, and then 940 of FIG. 9 are executed from the invocation at Block 835 and return a negative result. Block 820 will again have a negative result in the example, causing Block 825 to set the current table pointer to point to the next table (Department, which is also the last table) in the unordered list. Block 805 then executes again, moving the Department table to the end of the ordered list. The unordered list is therefore empty, and the ordered list contains Employee, Address, Department.

Two relationships exist for the Department table, one with Employee and one with Address. Thus Block 810 has a positive result. When evaluating the Department to Employee relationship, Block 835 has a positive result, and processing reaches Block 860. Block 860 now also has a positive result, because the related table (Employee) is already on the ordered list. Therefore, Block 865 will push the current table (Department) onto a stack used for FIG. 8, and Block 870 will then change the current table pointer so that it points to the related (Employee) table. Block 805 now moves the current (Employee) table from its existing location in the ordered list to the end of the ordered list, which has the effect of ordering the list according to the relationship between the table just pushed onto the stack and the current table. In the example, the ordered list now contains Address, Department, and Employee, where Employee has been moved to a later position in the list (and therefore a lower precedence for inserts) than Department.

Blocks 810, 830, and 835 will then execute again, this time evaluating the Employee to Department relationship which returns a negative result from FIG. 9. Blocks 840 and 845 will then execute, getting the Employee to Address relationship. For this relationship, Block 835 has a positive result, and control will again reach Block 860. Block 860 detects that the related Address table is already on the ordered list, and Block 865 will therefore push the current Employee table onto the stack (which now contains Employee and Department). Blocks 870 and 805 then cause the Address table to be moved from its existing position at the front of the ordered list, to now become the last entry at the end of the list. The ordered list of the example is now in the proper order for inserts, as depicted at 511, 512, 513 of FIG. 5.

The manner in which the processing of FIG. 8 finishes for the example will now be briefly described. The Address to Employee relationship is evaluated, and has a negative result in Block 835. Because this is the only relationship for Address, Block 840 transfers control to Block 815. At this point, there are two entries on the stack, so control transfers from Block 815 to Block 850 where the topmost element (Employee) is popped off and made the current table. Control returns to Block 840, which determines that all the relationships for Employee have already been processed, during the previous processing cycle in which Employee was pushed onto the stack. If, however, the stack push operation occurred because of a relationship which was not the last relationship for the current table, Block 840 will have a negative result, and control will transfer to Block 845 to begin processing the rest of the relationships for that table. Detecting that there are no more relationships to evaluate for Employee, control passes again to Block 815 and then to Block 850, where the Department table is popped off the stack and made the current table. As with Employee, Department was pushed onto the stack during evaluation of its final relationship, so Block 840 has a positive result and control again reaches Block 815. Because the stack is now empty, control will pass to Block 820, which will detect that the unordered list is empty. Control will then return to Block 700 of FIG. 7, having programmatically determined the proper insert order for the tables of an arbitrary database schema.

Note that the ordering algorithm shown in FIG. 8 is merely one approach that may be used for taking relationship information among tables, which typically forms a network structure, and generating a flattened sequential representation of the pertinent information. By considering only the constraints, rather than the entire relationship, between pairs of tables, the network can be treated as a tree. Therefore it is not possible for cycles to exist. The approach which has been described in FIG. 8 is a relatively simple and straightforward technique for converting trees to flattened lists, and is therefore used as the preferred embodiment. Other approaches for converting trees to flattened lists may be used alternatively, without deviating from the inventive concepts disclosed herein. For example, rather than moving a table to the end of the ordered list to enforce an ordering among two tables, as has been described, a more complex approach could be used which moves the table so that it directly follows the table on which it depends.

After Blocks 700 and 710 complete, the insert and delete ordering have been determined. When the present invention is used partly as a preprocessing step and partly at run-time, as previously discussed, the preprocessing comprises this determination of ordering (after first determining the tables and relationships for the schema of interest, using techniques of the prior art as previously stated). The clustering process (which is shown as being invoked next from Block 720 of FIG. 7) and performing the operations to apply the tuples generated by an application program to modify a database (Blocks 730–750) occur at run-time. (Or, the clustering and application of modifications may be applied after the application completes its run-time processing.)

Turning now to FIG. 11, the clustering technique used by the preferred embodiment of the present invention to put the tuples into the appropriate list (such as 531–533, 541–543, or 551–553 of FIG. 5) will now be described. On entering this processing, an unordered list of tuples representing modifications to be made to the database has been created by an application program. When used with a transaction-oriented application, for example, this logic may be invoked upon completion of each transaction to perform the modifications generated during the transaction's scope, as previously stated. In that case, the tuple list represents the modifications for that transaction. Or, if the logic of FIG. 11 is invoked only when an application is complete, the tuple list contains all the modifications generated during the entire scope of the application.

Block 1100 gets the first element from the tuple list, and Block 1110 determines the table that is to be affected by this tuple (i.e. the table for which the tuple specifies a primary key value). Block 1140 asks whether the tuple is for an insert operation. If so, at Block 1150 the tuple is added to the insert list for the table determined by Block 1110. Otherwise, Block 1160 asks whether the tuple is for a delete operation. In this case, Block 1170 adds the tuple to the appropriate table's delete list; otherwise, Block 1180 adds it to the appropriate table's update list. As has been stated, a benefit of the present invention is that no ordering within the lists for a particular table is required, and therefore the clustering logic of FIG. 11 is fast and efficient. After having added the tuple to the appropriate list, control reaches Block 1130 which checks to see if all the tuples have been processed. If so, the processing of FIG. 11 is complete and control returns to the invoking logic (Block 720 of FIG. 7). Otherwise, Block 1120 gets the next element from the tuple list and the process of adding each tuple to the appropriate list continues in the manner which has been described, until Block 1130 has a negative result.

As has been demonstrated, the present invention provides an efficient technique for programmatically ordering operations to be performed against an arbitrary relational database while automatically maintaining the referential integrity among the tables of that database. This technique may be used at the database engine itself. Applications may make beneficial use of the programmatic ordering technique without requiring change to the applications themselves. When used with Enterprise JavaBeans, this technique enables the container to be independent of the persistence mechanism, such that the container is not required to know the details of how to persist. Furthermore, because the modification tuples are clustered by table when using the present invention, it is possible to know all the modifications that are to be performed upon a particular table (as opposed to prior art techniques, where this "big picture" view is not available). This technique also enables use of batch-write operations, resulting in greatly improved performance as compared to the approach which is prevalent in the prior art (i.e. of separately transmitting each write operation to the database engine in order to avoid the complex process of resolving an order among the writes). When using batched write operations, the number of network round-trips may be reduced to a worst-case scenario of (3*the number of tables), where the 3 represents the different operation types. (When only one operation type is being performed, the number of round-trips may then be reduced to the number of tables affected.)

While a preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and such modifications as fall within the spirit and scope of the invention.

I claim:

1. A computer program product for programmatically ordering operations to be performed against a relational database in order to maintain referential integrity of said database, said computer program product embodied on a computer-readable medium and comprising:

computer-readable program code means for determining, for a plurality of tables of said database, an order in which inserts should be made to said tables;

computer-readable program code means for determining, for said plurality of tables of said database, an order in which deletes should be made to said tables;

computer-readable program code means for grouping a plurality of modifications to be made to said database according to (1) an operation to be performed by each of said modifications and according to (2) a particular one of said tables which is to be affected by each of said modifications; and computer-readable program code means for applying said grouped modifications to said database, further comprising:

computer-readable program code means for first applying all of said grouped modifications for which said operation is insert, according to said insert order;

computer-readable program code means for next applying all of said grouped modifications for which said operation is update; and computer-readable program code means for last applying all of said grouped modifications for which said operation is delete, according to said delete order.

2. The computer program product according to claim 1, wherein said grouped modifications for which said operation is update are applied in an arbitrary order.

3. The computer program product according to claim 1, wherein operation of said computer-readable program code means for determining said order in which inserts should be made and said computer-readable program code means for determining said order in which deletes should be made is performed at a time prior to operation of said computer-readable program code means for grouping and said computer-readable program code means for applying.

4. The computer program product according to claim 1, wherein said computer program product operates at a relational database engine.

5. The computer program product according to claim 1, wherein said computer program product operates separately from an application program generating said modifications.

6. The computer program product according to claim 1, wherein operation of said computer-readable program code means for grouping and said computer-readable program code means for applying is performed repeatedly for each of a subsequent plurality of modifications.

7. The computer program product according to claim 1, wherein said computer-readable program code means for applying is performed in a batch-write mode.

8. The computer program product to claim 1, wherein said computer-readable program code means for determining said order in which inserts should be made further comprises:

computer-readable program code means for identifying, for each selected one of said tables, one or more related tables;

computer-readable program code means for determining, among said selected table and each of said related tables, an insert precedence; and computer-readable program code means for ordering said selected table before said related tables for which said selected table has insert precedence, and ordering said selected table after said related tables for which said selected table does not have insert precedence.

9. The computer program product according to claim 1, wherein said computer-readable program code means for determining said order in which deletes should be made further comprises:

computer-readable program code means for identifying, for each selected one of said tables, one or more related tables;

computer-readable program code means for determining, among said selected table and each of said related tables, a delete precedence; and computer-readable program code means for ordering said selected table before said related tables for which said selected table has delete precedence, and ordering said selected table after said related tables for which said selected table does not have delete precedence.

10. The computer program product according to claim 8, wherein said computer-readable program code means for determining said insert precedence further comprises:

computer-readable program code means for determining, for said selected table and each particular one of said related tables, whether a relationship between said selected table and said particular related table has a constraint;

computer-readable program code means for determining, when said constraint exists, whether a foreign key of said constraint is located in said particular related table;

computer-readable program code means for concluding that said selected table does not have said insert precedence when said constraint does not exist or when said foreign key is not located in said particular related table; and computer-readable program code means for concluding that said selected table does have said insert precedence when said foreign key is located in said particular related table.

11. The computer program product according to claim 9, wherein said computer-readable program code means for determining said delete precedence further comprises:

computer-readable program code means for determining, for said selected table and each particular one of said related tables, whether a relationship between said selected table and said particular related table has a constraint;

computer-readable program code means for determining, when said constraint exists, whether a foreign key of said constraint is located in said selected table;

computer-readable program code means for concluding that said selected table does not have said delete precedence when said constraint does not exist or when said foreign key is not located in said selected table; and computer-readable program code means for concluding that said selected table does have said selected precedence when said foreign key is located in said selected table.

12. A system for programmatically ordering operations to be performed against a relational database in order to maintain referential integrity of said database in a computing environment, comprising:

means for determining, for a plurality of tables of said database, an order in which inserts should be made to said tables;

means for determining, for said plurality of tables of said database, an order in which deletes should be made to said tables;

means for grouping a plurality of modifications to be made to said database according to (1) an operation to be performed by each of said modifications and according to (2) a particular one of said tables which is to be affected by each of said modifications; and means for applying said grouped modifications to said database, further comprising:

means for first applying all of said grouped modifications for which said operation is insert, according to said insert order;

means for next applying all of said grouped modifications for which said operation is update; and means for last applying all of said grouped modifications for which said operation is delete, according to said delete order.

13. The system according to claim 12, wherein said grouped modifications for which said operation is update are applied in an arbitrary order.

14. The system according to claim 12, wherein operation of said means for determining said order in which inserts should be made and said means for determining said order in which deletes should be made is performed at a time prior to operation of said means for grouping and said means for applying.

15. The system according to claim 12, wherein said system operates at a relational database engine.

16. The system according to claim 12, wherein said system operates separately from an application program generating said modifications.

17. The system according to claim 12, wherein operation of said means for grouping and said means for applying is performed repeatedly for each of a subsequent plurality of modifications.

18. The system according to claim 12, wherein said means for applying is performed in a batch-write mode.

19. The system according to claim 12, wherein said means for determining said order in which inserts should be made further comprises:

means for identifying, for each selected one of said tables, one or more related tables;

means for determining, among said selected table and each of said related tables, an insert precedence; and means for ordering said selected table before said related tables for which said selected table has insert precedence, and ordering said selected table after said related tables for which said selected table does not have insert precedence.

20. The system according to claim 12, wherein said means for determining said order in which deletes should be made further comprises:

means for identifying, for each selected one of said tables, one or more related tables;

means for determining, among said selected table and each of said related tables, a delete precedence; and means for ordering said selected table before said related tables for which said selected table has delete precedence, and ordering said selected table after said related tables for which said selected table does not have delete precedence.

21. The system according to claim 19, wherein said means for determining said insert precedence further comprises:

means for determining, for said selected table and each particular one of said related tables, whether a relationship between said selected table and said particular related table has a constraint;

means for determining, when said constraint exists, whether a foreign key of said constraint is located in said particular related table;

means for concluding that said selected table does not have said insert precedence when said constraint does not exist or when said foreign key is not located in said particular related table; and means for concluding that said selected table does have said insert precedence when said foreign key is located in said particular related table.

22. The system according to claim 20, wherein said means for determining said delete precedence further comprises:

means for determining, for said selected table and each particular one of said related tables, whether a relationship between said selected table and said particular related table has a constraint;

means for determining, when said constraint exists, whether a foreign key of said constraint is located in said selected table;

means for concluding that said selected table does not have said delete precedence when said constraint does not exist or when said foreign key is not located in said selected table; and means for concluding that said selected table does have said delete precedence when said foreign key is located in said selected table.

23. A method for programmatically ordering operations to be performed against a relational database in order to maintain referential integrity of said database, comprising the steps of:

determining, for a plurality of tables of said database, an order in which inserts should be made to said tables;

determining, for said plurality of tables of said database, an order in which deletes should be made to said tables;

grouping a plurality of modifications to be made to said database according to (1) an operation to be performed by each of said modifications and according to (2) a particular one of said tables which is to be affected by each of said modifications; and applying said grouped modifications to said database, further comprising the steps of:

first applying all of said grouped modifications for which said operation is insert, according to said insert order;

next applying all of said grouped modifications for which said operation is update; and last applying all of said grouped modifications for which said operation is delete, according to said delete order.

24. The method according to claim 23, wherein said grouped modifications for which said operation is update are applied in an arbitrary order.

25. The method according to claim 23, wherein operation of said step of determining said order in which inserts should be made and said step of determining said order in which deletes should be made is performed at a time prior to operation of said step of grouping and said step of applying.

26. The method according to claim 23, wherein said method operates at a relationship database engine.

27. The method according to claim 23, wherein said method operates separately from an application program generating said modifications.

28. The method according to claim 23, wherein operation of said grouping step and said applying step is performed repeatedly for each of a subsequent plurality of modifications.

29. The method according to claim 23, wherein said applying step is performed in a batch-write mode.

30. The method according to claim 23, wherein said step of determining said order in which inserts should be made further comprises the steps of:

identifying, for each selected one of said tables, one or more related tables;

determining, among said selected table and each of said related tables, an insert precedence; and ordering said selected table before said related tables for which said selected table has insert precedence, and ordering said selected table after said related tables for which said selected table does not have insert precedence.

31. The method according to claim 23, wherein said step of determining said order in which deletes should be made further comprises the steps of:

identifying, for each selected one of said tables, one or more related tables;

determining, among said selected table and each of said related tables, a delete precedence; and ordering said selected table before said related tables for which said selected table has delete precedence, and ordering said selected table after said related tables for which said selected table does not have delete precedence.

32. The method according to claim 30, wherein said step of determining said insert precedence further comprises the steps of:

determining, for said selected table and each particular one of said related tables, whether a relationship between said selected table and said particular related table has a constraint;

determining, when said constraint exists, whether a foreign key of said constraint is located in said particular related table;

concluding that said selected table does not have said insert precedence when said constraint does not exist or when said foreign key is not located in said particular related table; and concluding that said selected table does have said insert precedence when said foreign key is located in said particular related table.

33. The method according to claim 31, wherein said step of determining said delete precedence further comprises the steps of:

determining, for said selected table and each particular one of said related tables, whether a relationship between said selected table and said particular related table has a constraint;

determining, when said constraint exists, whether a foreign key of said constraint is located in said selected table;

concluding that said selected table does not have said delete precedence when said constraint does not exist or when said foreign key is not located in said selected table; and concluding that said selected table does have said delete precedence when said foreign key is located in said selected table.

* * * * *